United States Patent
Mottur et al.

(10) Patent No.: US 10,663,318 B2
(45) Date of Patent: May 26, 2020

(54) DISTRIBUTING MAPS, FLOOR PLANS AND BLUEPRINTS TO USERS BASED ON THEIR LOCATION

(71) Applicant: Vizsafe, Inc., Middletown, RI (US)

(72) Inventors: Peter A. Mottur, Portsmouth, RI (US); Brendan J. Hanna, Somerset, MA (US); Claude P. Sheer, Asheville, NC (US)

(73) Assignee: Vizsafe, Inc., Newport, RI (US)

( * ) Notice: Subject to any disclaimer, the term of this patent is extended or adjusted under 35 U.S.C. 154(b) by 209 days.

(21) Appl. No.: 15/481,256

(22) Filed: Apr. 6, 2017

(65) Prior Publication Data

US 2017/0293634 A1    Oct. 12, 2017

Related U.S. Application Data

(60) Provisional application No. 62/319,529, filed on Apr. 7, 2016.

(51) Int. Cl.
| | |
|---|---|
| *G01C 21/36* | (2006.01) |
| *G01C 21/20* | (2006.01) |
| *G08G 1/137* | (2006.01) |
| *H04W 4/02* | (2018.01) |
| *H04W 4/021* | (2018.01) |

(52) U.S. Cl.
CPC ....... *G01C 21/3697* (2013.01); *G01C 21/206* (2013.01); *G01C 21/3679* (2013.01); *G01C 21/3694* (2013.01); *G08G 1/137* (2013.01); *H04W 4/021* (2013.01); *H04W 4/025* (2013.01)

(58) Field of Classification Search
CPC ............ G01C 21/3697; G01C 21/3694; G01C 21/3679; G01C 21/206; H04W 4/025; H04W 4/021; G08G 1/137
See application file for complete search history.

(56) References Cited

U.S. PATENT DOCUMENTS

| | | | | |
|---|---|---|---|---|
| 5,938,721 | A * | 8/1999 | Dussell et al. | G01C 21/26 701/521 |
| 6,266,614 | B1 * | 7/2001 | Alumbaugh | G01C 21/3679 701/516 |
| 6,377,210 | B1 * | 4/2002 | Moore | G01C 21/26 701/532 |
| 7,271,742 | B2 * | 9/2007 | Sheba et al. | G01C 21/3664 701/533 |
| 7,308,246 | B2 | 12/2007 | Yamazaki et al. | |
| 7,418,339 | B2 * | 8/2008 | Liu et al. | G01C 21/34 701/526 |
| 7,606,579 | B2 * | 10/2009 | Thacher | G01C 21/30 701/408 |
| 8,019,271 | B1 | 9/2011 | Izdepski | |
| 8,417,258 | B2 | 4/2013 | Barnes, Jr. | |
| 8,483,654 | B2 | 7/2013 | Levinson et al. | |
| 8,548,419 | B1 | 10/2013 | Sennett et al. | |
| 8,548,423 | B2 | 10/2013 | Rao | |

(Continued)

FOREIGN PATENT DOCUMENTS

WO    2016005799 A1    1/2016

*Primary Examiner* — Dale W Hilgendorf
(74) *Attorney, Agent, or Firm* — Barlow, Josephs & Holmes, Ltd.

(57) ABSTRACT

The method and system described herein is directed to a method and system that provides users with relevant maps, floorplans, blueprints automatically based on the user's location.

19 Claims, 17 Drawing Sheets

(56) References Cited

U.S. PATENT DOCUMENTS

| | | | |
|---|---|---|---|
| 8,750,907 B2* | 6/2014 | Won | H04W 4/021 455/456.6 |
| 8,878,938 B2 | 11/2014 | Levinson et al. | |
| 8,880,718 B2 | 11/2014 | Caudle et al. | |
| 8,929,851 B2 | 1/2015 | Mills et al. | |
| 8,948,732 B1 | 2/2015 | Negahban et al. | |
| 8,989,700 B2 | 3/2015 | Cordero et al. | |
| 9,154,562 B2 | 10/2015 | Schulzrinne et al. | |
| 9,154,740 B2 | 10/2015 | Levinson et al. | |
| 9,179,256 B1* | 11/2015 | Pietraniec | H04W 4/021 |
| 9,196,307 B2 | 11/2015 | Caudle et al. | |
| 2003/0229441 A1* | 12/2003 | Pechatnikov et al. | G01C 21/3679 701/411 |
| 2006/0223518 A1* | 10/2006 | Haney | H04W 4/021 455/420 |
| 2008/0306826 A1* | 12/2008 | Kramer et al. | H04W 4/021 705/14.14 |
| 2009/0005080 A1 | 1/2009 | Forstall et al. | |
| 2010/0151880 A1* | 6/2010 | Jang et al. | H04W 4/025 455/456.1 |
| 2011/0077023 A1* | 3/2011 | Won | H04W 4/021 455/456.1 |
| 2012/0157129 A1* | 6/2012 | Kuwahara | H04W 4/021 455/456.1 |
| 2013/0091452 A1* | 4/2013 | Sorden et al. | H04W 4/021 715/771 |
| 2014/0213304 A1* | 7/2014 | Beckett et al. | G01C 21/3679 455/456.6 |
| 2015/0111524 A1* | 4/2015 | South | H04W 4/021 455/404.2 |
| 2015/0222672 A1 | 8/2015 | Vaughn et al. | |
| 2015/0237475 A1* | 8/2015 | Henson et al. | H04W 4/021 455/456.3 |
| 2016/0027307 A1* | 1/2016 | Abhyanker et al. | G01C 21/3697 701/117 |
| 2016/0044456 A1* | 2/2016 | Lott et al. | H04W 4/021 455/456.3 |
| 2016/0169695 A1* | 6/2016 | Hall et al. | G01C 21/3679 701/426 |
| 2017/0034654 A1* | 2/2017 | Oberbeck et al. | H04W 4/021 |

\* cited by examiner

DISTRIBUTING MAPS, FLOOR PLANS AND BLUEPRINTS TO USERS BASED ON THEIR LOCATION

CROSS REFERENCE TO RELATED APPLICATION

This patent document claims priority to earlier filed U.S. Provisional Patent Application No. 62/319,529, filed on Apr. 7, 2016, the entire contents of which are incorporated herein by reference.

BACKGROUND OF THE INVENTION

Using mobile and fixed devices, such as camera enabled phones, tablets, portable computers, laptops and workstations to disseminate, view and report incident related information to users over a network is useful. Such incident based reporting supports posting of multimedia (content), user and content geolocation, mapping and bi-directional communications (2-way) and can include but is not limited to photos, videos, live video streaming, audio clips, live audio streaming, text based messaging and associated metadata such as latitude, longitude, elevation, floor level, field of view, orientation, bearing, date, time, user details, device, carrier and network information.

SUMMARY OF THE INVENTION

The method and system described herein is directed to a method and system that provides users with relevant maps, floorplans, blueprints automatically based on the user's location.

According to some possible implementations, a user may initiate and receive relevant maps, floorplans, and blueprints according to an aspect of the method and system described herein. A user may initiate or receive a request for diagrammatic representation of a predetermined location proximate to them. This request may occur automatically based on the user's location. A server platform determines whether the user is proximate to the predetermined location and then transmits the diagrammatic representation to the user device, which receives the diagrammatic representation. The user device displays the diagrammatic representation to the user where the user may view the diagrammatic representation on the user device.

BRIEF DESCRIPTION OF THE DRAWINGS

The novel features which are characteristic of the method and system described herein are set forth in the appended claims. However, the example implementations and embodiments, together with further objects and attendant advantages, will be best understood by reference to the following detailed description taken in connection with the accompanying drawings in which:

DETAILED DESCRIPTION OF THE PREFERRED EMBODIMENTS

The following detailed description of example implementations refers to the accompanying drawings. The same reference numbers in different drawings may identify the same or similar elements.

Figure 1:
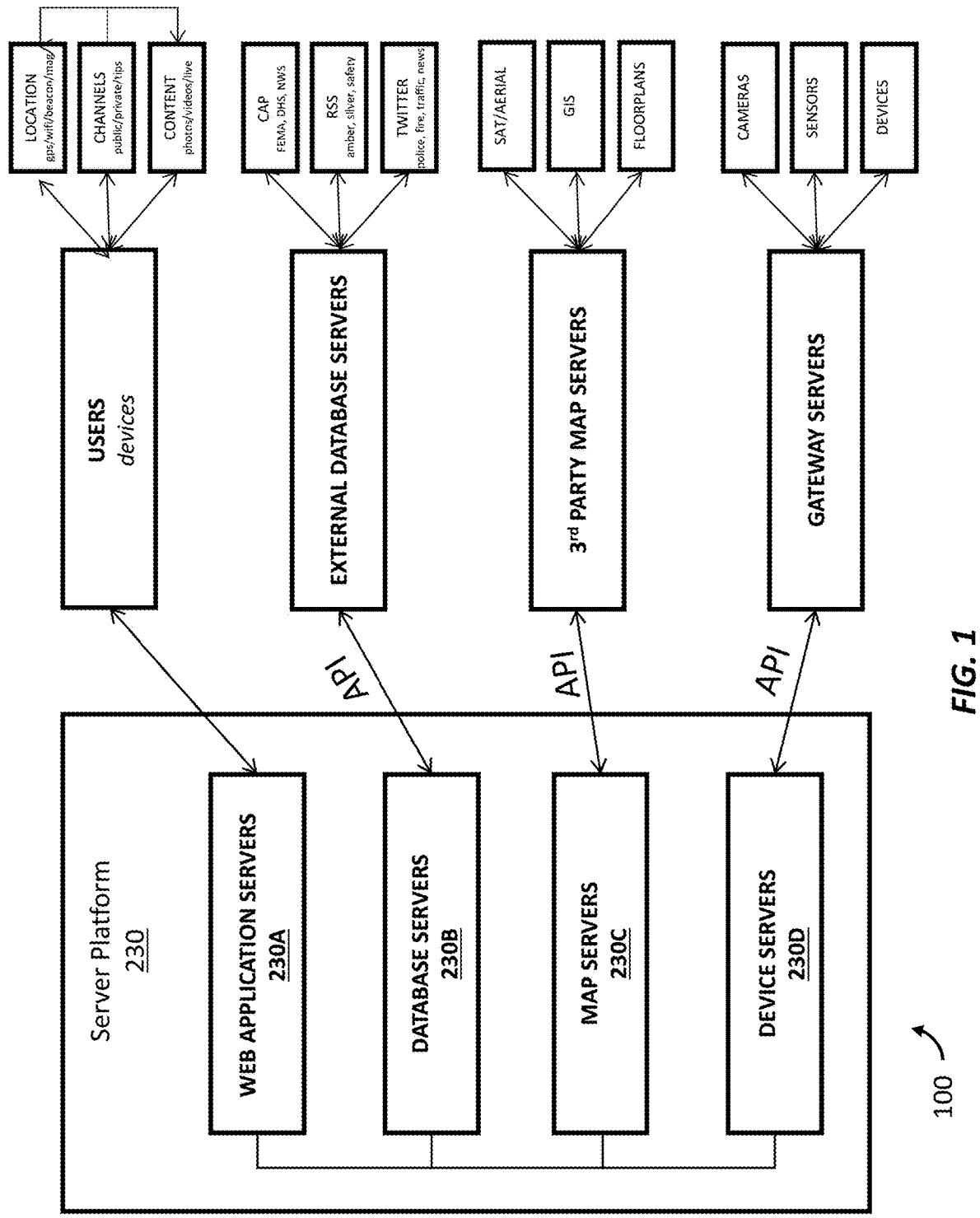
FIG. 1 is a diagram of an overview of an example implementation described herein.

FIG. 1 is a diagram of an overview of an example implementation 100 described herein. As shown in FIG. 1, the system includes a cloud-based server platform 230 having a number of servers 230*a-d*. Each server 230 may be optimized to perform a certain task. However, a server 230 may be configured to perform more than a single task for efficiency and multiple servers may be configured to perform the same task to improve volume processing as needed.

A web application server 230*a* manages user's interactions with the system. Each device connected to the system by a user may provide location data sourced from GPS, Wi-Fi, beacon, and magnetic data from the users' devices 210, as shown in FIG. 2, nearby devices and extrapolated from known devices connected to the system.

A database server 230*b* manages database communications to external databases. External database servers provide data from other services, such as messages from proprietary sources, such as TWITTER, and open sources, such as real simple syndication (RSS) feeds and common alerting protocol (CAP) feeds, having relevant incident information. For instance, TWITTER feeds may include accounts from authorities, such as police, fire, traffic and news reporting feeds; RSS feeds may include amber alerts, silver alerts and other safety alerts; and CAP feeds may include alerts from federal authorities, such as FEMA, DHS and NWS.

A map server 230c provides an application programming interface as a gateway for third party map servers. Third party map servers may provide satellite and aerial imagery, geographic information system (GIS) maps and indoor floorplans of buildings and structures.

Figure 2:
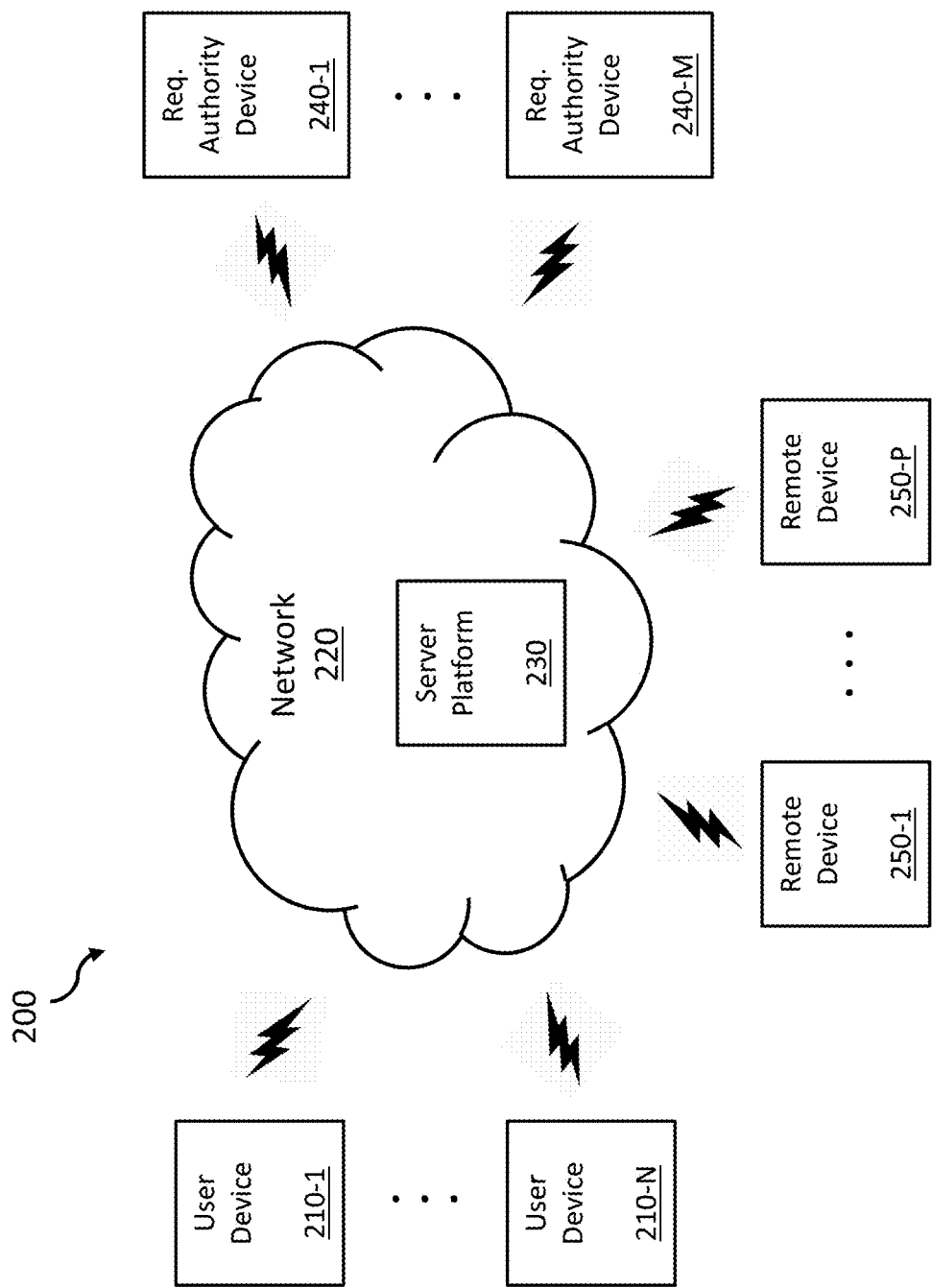
FIG. 2 is a diagram of an example environment in which systems and/or methods, descried herein, may be implemented.

A device server 230d provides an API to gateway servers for remote devices 250, as shown in FIG. 2, such as remotely operated cameras, sensors and other such devices, such as smoke detectors, fire alarms, remote entry control devices, and other such web-enabled devices. These remote devices may be viewed by users of the system.

FIG. 2 is a diagram of an example environment 200 in which systems and/or methods, described herein, may be implemented. As shown in FIG. 2, environment 200 may include a plurality of user devices 210-1 through 210-N, a network 220, a server platform 230, a plurality of requesting authority devices 240-1 through 240-M, and a plurality of remote devices, 250-1 through 250-P. Devices of environment 200 may interconnect via wired connections, wireless connections, or a combination of wired and wireless connections. The devices of the system and method are generally a number of networked hardware devices, such as computers, cameras, mobile devices, and the like, that are interconnected to a network, such as a private network or the Internet.

User device 210 may include one or more devices used by a user to access network 220, server platform 230, and/or one or more remote devices 250 shown in environment 200. For example, user device 210 may include a computing device, such as a desktop computer, a laptop computer, a tablet computer, a mobile phone, or a similar type of device. In some implementations, a user may use user device 210 to provide incident information to and/or receive incident information, or a request for incident information from one or more devices of environment 200, such as server platform 220, requesting authority device 240, and/or remote device 250.

Requesting authority device 240 may include one or more devices used by a requesting authority, such as a police or fire department, for example, to access network 220, server platform 230, and/or one or more remote devices 250 shown in environment 200. For example, requesting authority device 240 may include a computing device, such as a desktop computer, a laptop computer, a tablet computer, a mobile phone, or a similar type of device. In some implementations, the requesting authority may use requesting authority device 240 to provide incident information to and/or receive incident information, or a request for incident information from one or more devices of environment 200, such as server platform 220, user device 210, and/or remote device 250.

Remote devices 250 may include one or more configurable network devices capable of connecting to a network to provide remote sensing information for particular locations. For example, remote device 250 may include a camera, a remote sensor or a similar type of device, that is configured to be accessible for incident information from user devices 210 and requesting authority devices 240. Remote device 250 may interact with one or more devices of environment 200 to perform the method and process for providing incident information, as described in more detail elsewhere herein.

Network 220 may include one or more wired and/or wireless networks associated with a user. For example, network 220 may include a local area network (LAN), a wide area network (WAN), a private network, an intranet, a cellular network, a public land mobile network (PLMN), a metropolitan area network (MAN), a telephone network (e.g., the Public Switched Telephone Network (PSTN)), an ad hoc network, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
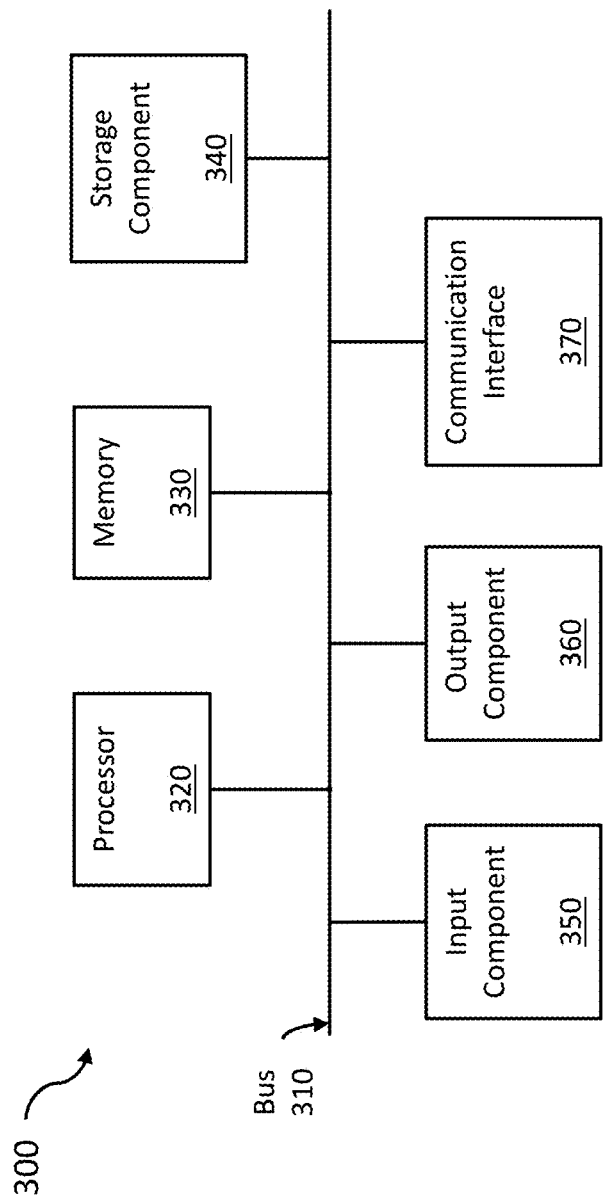
FIG. 3 is a is a diagram of example components of one or more devices of FIG. 2.

FIG. 3 is a diagram of example components of a device 300. Device 300 may correspond to user device 210, server platform 230, requesting authority device 240, and remote device 250. In some implementations, user device 210, server platform 230, requesting authority device 240, and remote device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
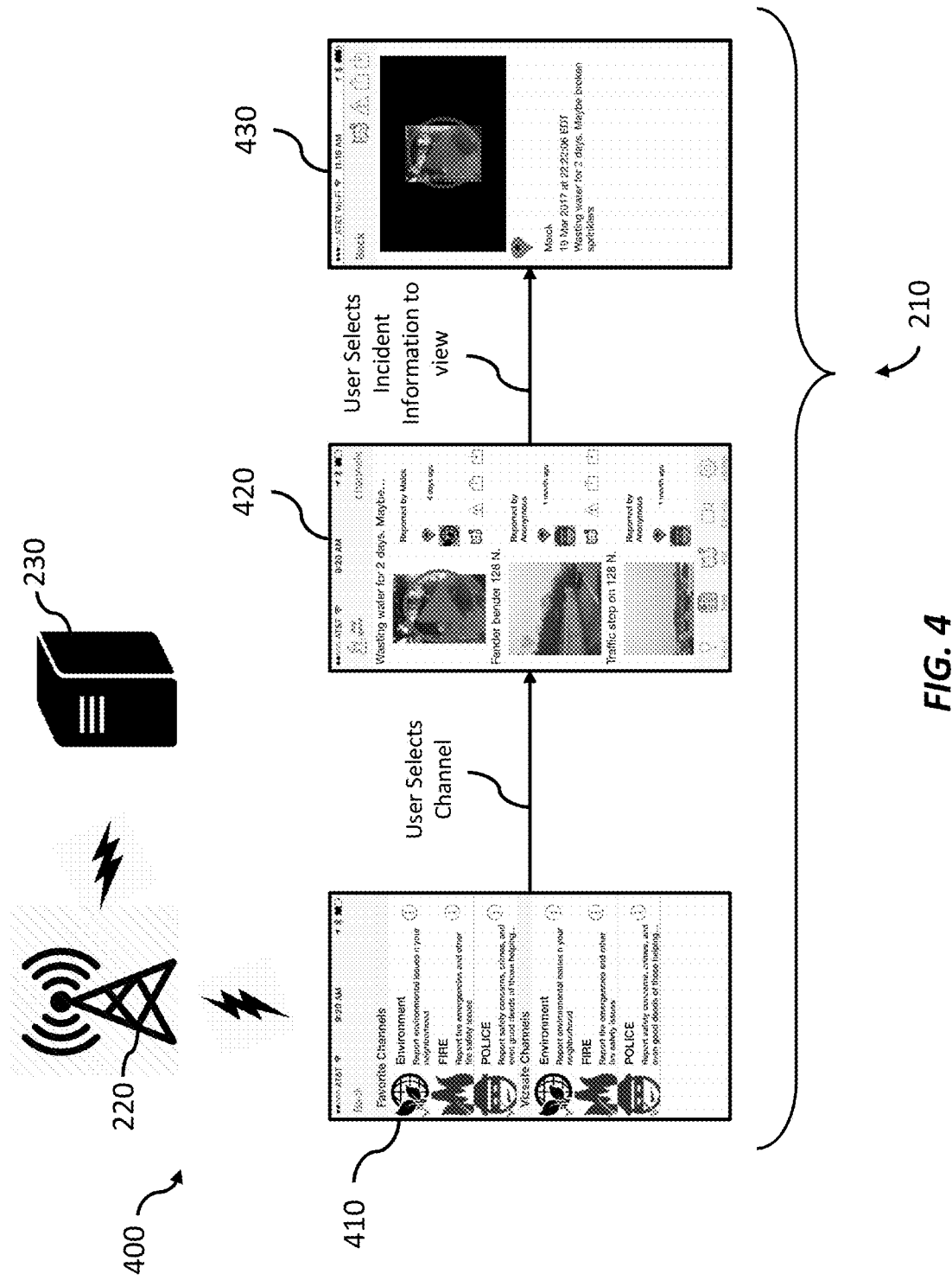
FIG. 4 is a diagram of an example implementation relating to the example methods and/or systems described herein.

FIG. 4 is a diagram of an overview of an example implementation 400 described herein where a user may receive channels of incident information proximate to a predetermine location. As shown in FIG. 4, a user device initiates a request through network 220 to server platform 230 for channels of incident information proximate to a predetermined location, such as the user's location or a preselected location from the user's preferences (as described further below). The channels are returned to and displayed on the user's device 210, illustrated at 410, where the user may select a desired channel, illustrated at step 420, and view specific incident information, illustrated at step 430.

Figure 5:
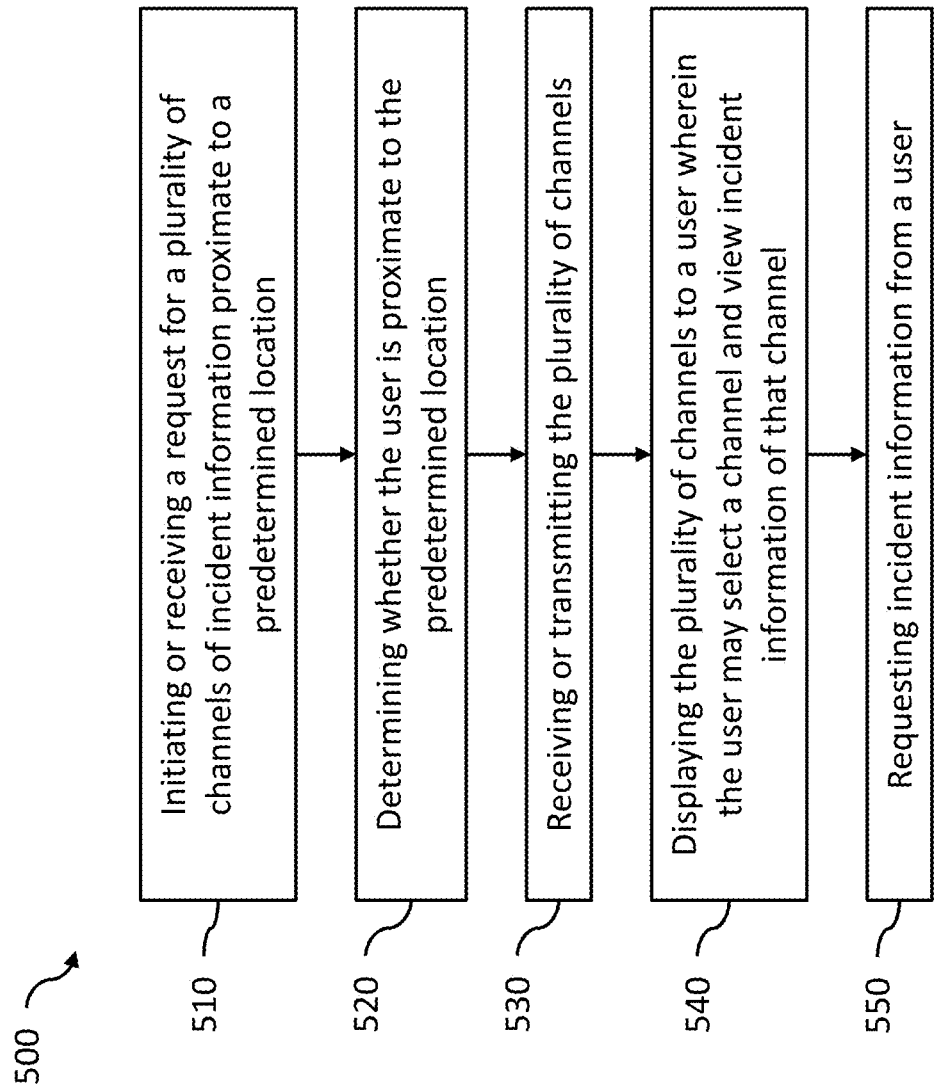
FIG. 5 is a flow chart of an example process for providing a user a selection of channels of incident information based on proximity to predetermined locations.

Referring to FIG. 5, process 500 may include initiating a request for a plurality of channels of incident information proximate to a predetermined location (block 510). For example, user device 210 may send a request to server platform 230.

As further shown in FIG. 5, process 500 may include determining whether the user is proximate to the predetermined location (block 520). For example, the user device may update server platform 230 with its current location. Server platform 230, then may ascertain which devices are proximate to the predetermined location to ascertain which user devices 210 should receive the channels of incident information.

As further shown in FIG. 5, process 500 may include receiving the plurality of channels (block 530). For example, once server platform 230 has ascertained which devices are proximate to the predetermined location, server platform 230 will transmit to the identified user devices 210, the channels of incident information proximate to those user devices 210. The user devices 210 will receive the transmitted channels of incident information from the server platform 230.

As further shown in FIG. 5, process 500 may include displaying the plurality of channels to a user wherein the user may select a channel and view incident information of that channel (block 540). For example, user device 210 may use an input component 350 to select one of the channels, where the incident information will then be retrieved by the processor 320 from memory 330 or storage component 340 and displayed on output component 360.

As further shown in FIG. 5, process 500 may include Requesting incident information from a user (block 550). For example, a requesting authority 240 may contact a user device 210 known to be, or have recently been, proximate to the predetermined location where incident information is desired.

Figure 6:
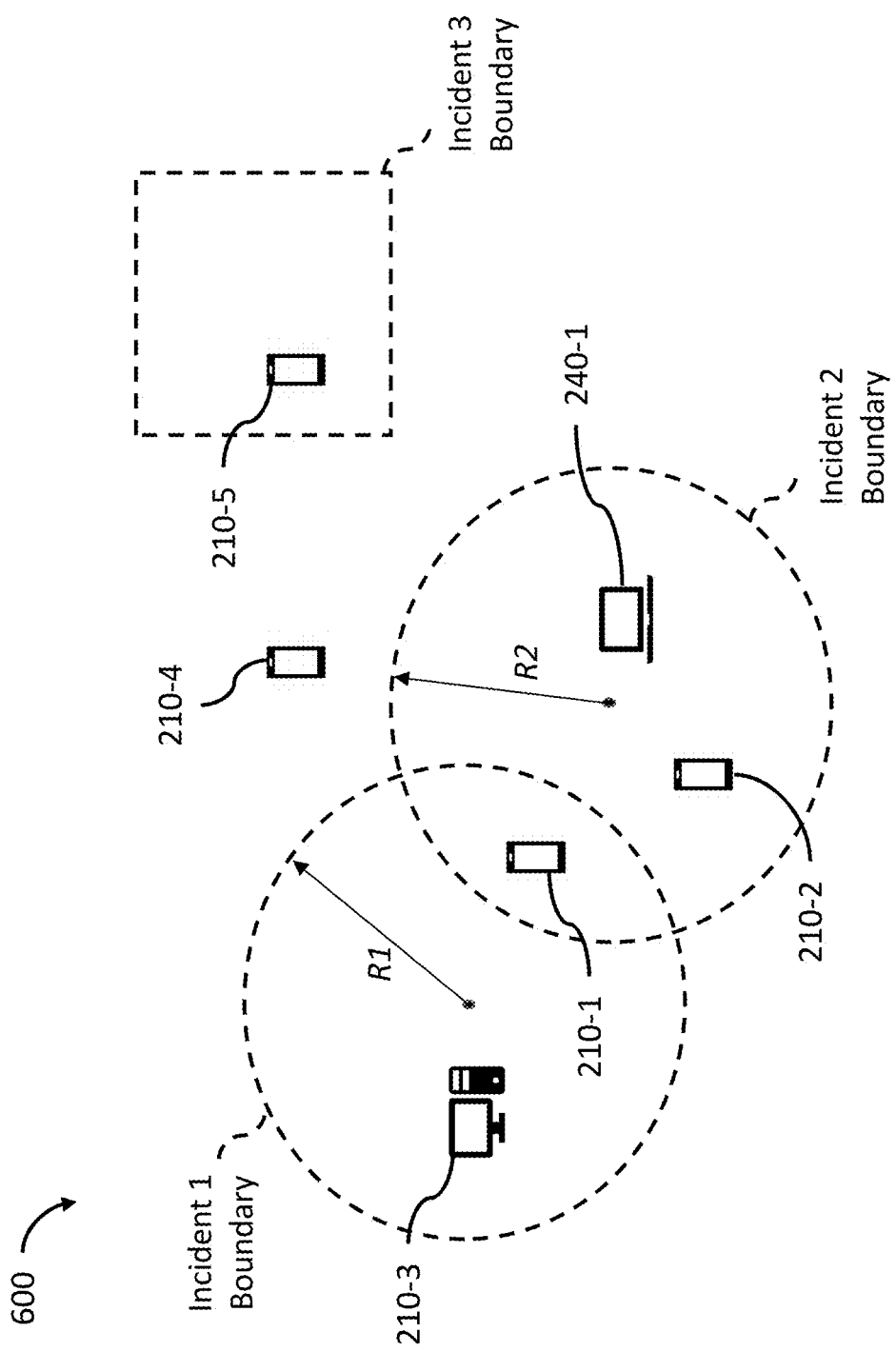
FIG. 6 is a diagram of an example implementation relating to the example methods and/or systems described herein.

FIG. 6 is a diagram of an example environment 600 in which systems and/or methods, described herein, may be implemented. As shown in FIG. 6, three exemplary incidents, Incident 1, Incident 2 and Incident 3, are illustrated having boundary. In incident 1, the boundary may be determined as a defined radius, R1, from a specific geographic coordinate. Incident 2, may also have a boundary with a radius, R2, from a different geographic coordinate from Incident 1. Further the radii R1 and R2 may be different. As illustrated, the boundaries of Incident 1 and Incident 2 may overlap, in which case user device 210-1, may receive channel information and other communications relating to both Incident 1 and Incident 2. In contrast, user device 210-2 and requester device 240-1 will receive only incident information from Incident 2 and user device 210-3 will only receive incident information from Incident 1. User device 210-4 will not receive incident information for either of Incident 1 or Incident 2.

As further shown in FIG. 6, Incident 3 may have a boundary defined in another shape. Furthermore, a boundary of an incident may be further defined by other characteristics, such as a zip code, postal code, town, city, state, county, or region. In this example, user device 210-5 would receive incident information and channels concerning Incident 3, but not of Incident 1 or Incident 2.

As can be seen, the exemplary embodiments include several novel features that can target individual users specifically based on their location and provide them with 'geo-aware' channels or categories to report to and content or information to receive. These geo-aware channels can be configured as publicly available or privately available and would only be available and visible to users within a particular location as defined by a zip code, postal code, town, city, state, county, region or specific geo-coordinates (i.e., latitude and longitude with a defined radius) representing a particular site, facility, venue or other area of interest as configured by the user. It could also be represented based on organization such as a business, municipality or government agency. Furthermore, it could be represented specific to a physical structure such as a building, complex, campus, bridge, tunnel, stadium, arena, track, field, mall, roadway, etc.

It should be understood that such communications are preferably bidirectional with the user to automatically determine the user's location and send the user the relevant geo-aware channels, categories, maps, floorplans, blueprints or related messages so that they can easily send incident reports to the appropriate organization responsible for or relevant to the location they are in. Additionally, users would be able to opt in to a tracking feature so that their location and movement could be mapped in real-time and they could be monitored and targeted for further correspondence or communications by a requestor or another user of the system as a call to action.

Figure 7:
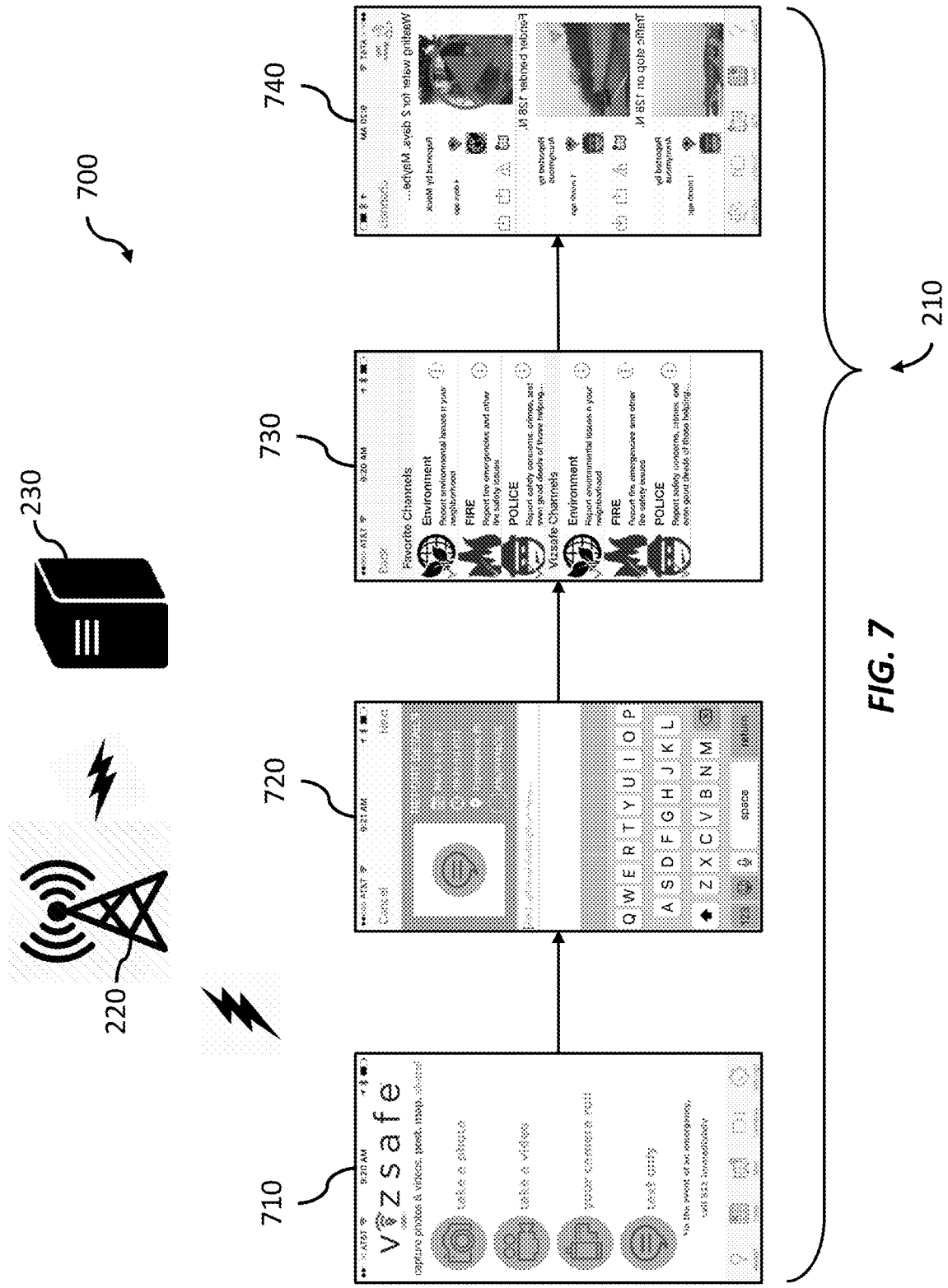
FIG. 7 is a diagram of an example implementation for requesting incident information from a user based on proximity to a predetermined location, relating to the methods and/or systems described herein.

FIG. 7 is a diagram of an overview of an example implementation 700 described herein where a user may compose and post incident information concerning an incident proximate to their locations. As shown in FIG. 7, a user, through user device 210, may select a desired type of post, such as a photo, video, text, illustrated as 710. The user may also choose live streaming video, audio or live streaming audio. The user may then, through user device 210, compose their post of incident information, illustrated 720. The user may then select the desired or most pertinent channel that the incident information pertains, illustrated at 730, and file the incident information post therein, illustrated at 740. The incident information is transmitted through network 220 to server platform 230, where it may be subsequently accessed by requesting authorities 240 and other user devices 210.

Figure 8:
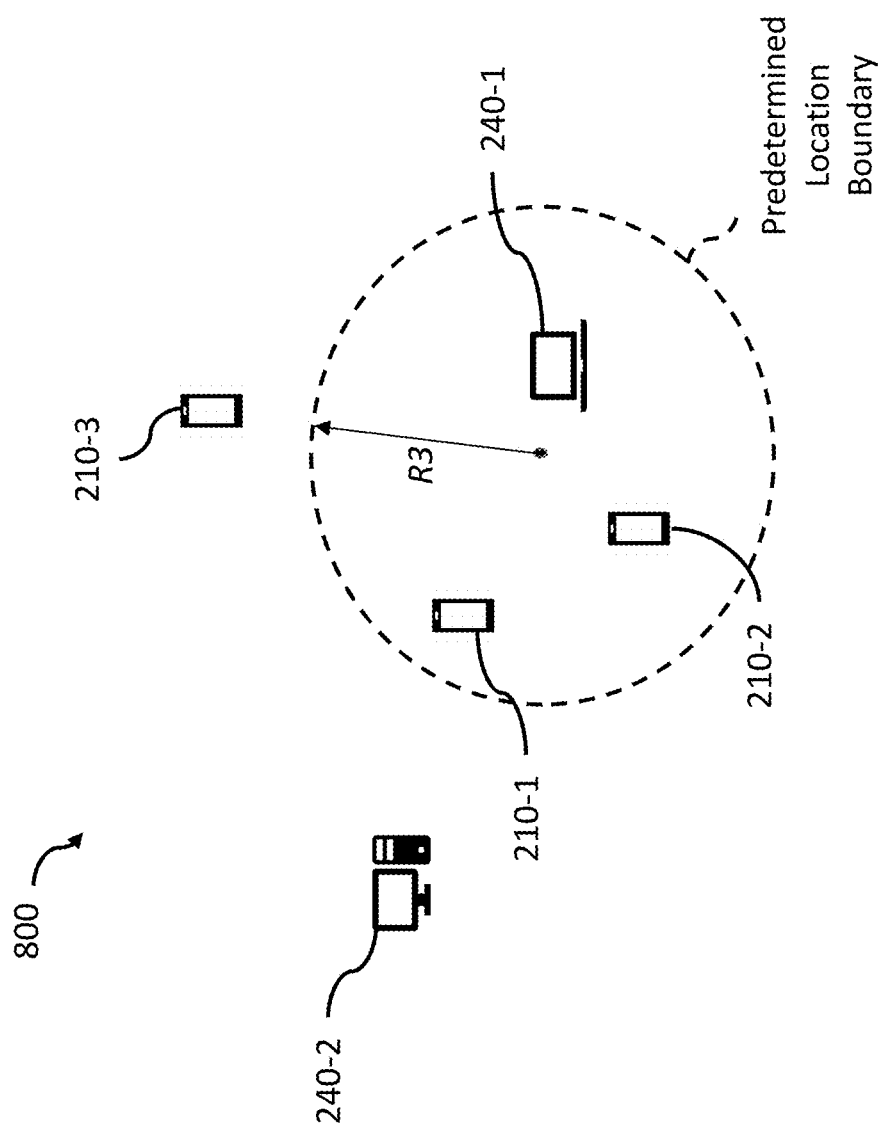
FIG. 8 is a diagram of an example environment where users and requesting authorities may solicit assistance and/or request information from users based on proximity to a predetermined location.

FIG. 8 is a diagram of an example environment 800 where the methods and/or systems described herein may be implemented. As shown in FIG. 8, a predetermined location has a boundary defined by a radius, R3, around a specific geographic coordinate. As shown in FIG. 6, the boundary may be defined by other parameters. User devices 210-1, 210-2 and requesting authority device 240-1, may send and receive requests for assistance and information to one another. User device 210-3 and requesting authority device 240-2, shown outside the boundary of the predetermined location, would not receive these requests, unless, as further described below, the user set a preference to follow the predetermined location, or the requesting authority ascertained, through the server platform 230 log of past user activity, that user 210-3 had recently been proximate to the predetermined location.

Figure 9:
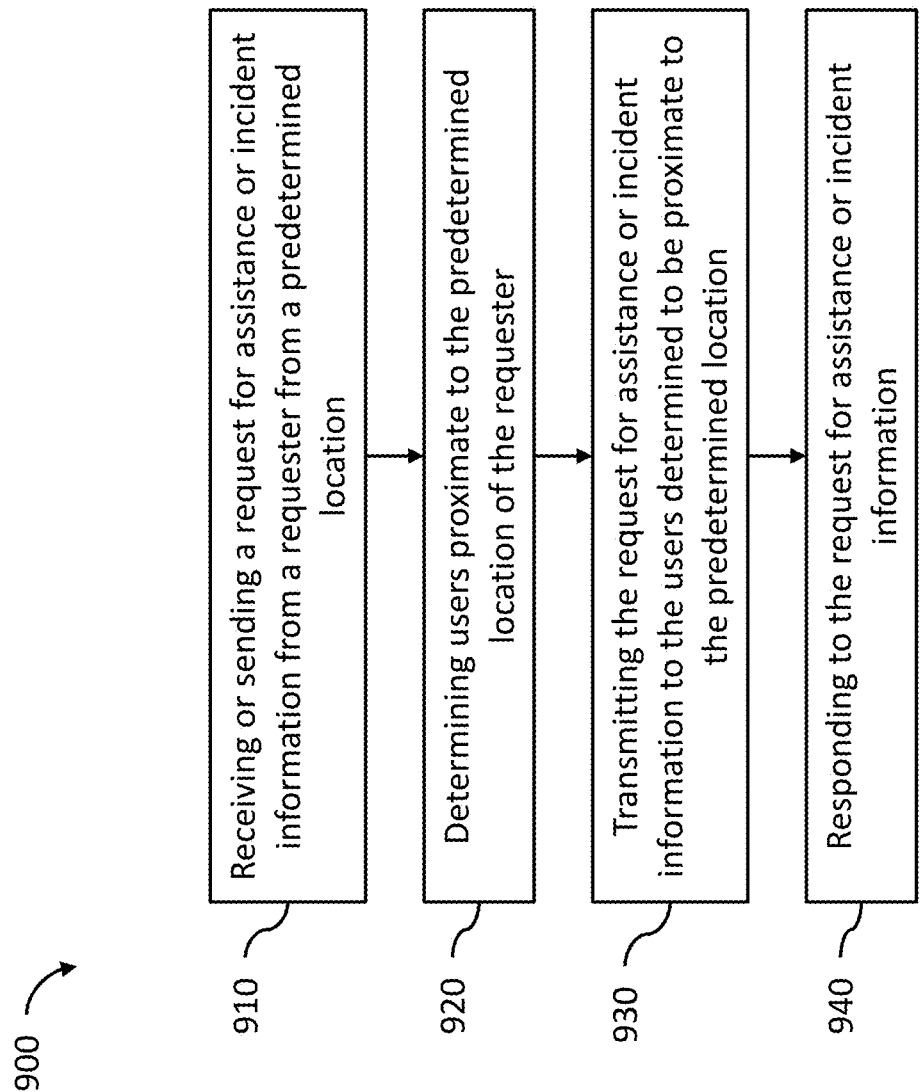
FIG. 9 is a flow chart of an example process where users and requesting authorities may solicit assistance and/or request information from users based on proximity to a predetermined location.

Referring to FIG. 9, process 900 may include receiving or sending a request for assistance or incident information from a requester from a predetermined location (block 910). For example, a user seeking assistance could use a device 210-1 to contact a user or an authority proximate to them, such as user device 210-2 or requester authority device 240-1, as illustrated in FIG. 8.

As further shown in FIG. 9, process 900 may include determining users proximate to the predetermined location of the requester (block 920). For example, server 230 may determine through user activity that user devices 210-1, 210-2, and requesting authority device 240-1, are proximate to one another based on a radius, R3, distance from a specific geographic coordinate. As described herein elsewhere, other parameters to ascertain whether users 210 and authorities 240 are proximate to one another may be used.

As further shown in FIG. 9, process 900 may include transmitting the request for assistance or incident information to the users determined to be proximate to the predetermined location (block 930). Server platform 230 may route requests to user devices 210 and requesting authority devices 240 determined to be proximate to the requester's location, such as user device 210-1 illustrated in FIG. 8.

As further shown in FIG. 9, process 900 may include Responding to the request for assistance or incident information (block 940). For example, a user may use their device 210 to transmit a message to the requester, relayed through server platform 230 or directly, such as through text messaging and/or voice communications.

In another example, a private security organization could send direct requests to a staff member to respond to an incident based on that staff member's proximity to an incident as represented on the map. Such requests could include but are not limited to photos, videos, live video streaming, audio clips, live audio streaming and text based messaging (i.e., multimedia). Both nearby users and remote users could access live camera streams from other mobile users' devices near an incident or from fixed cameras located near an incident.

In another example, a public safety or law enforcement organization could send a request to a specific user based on their location requesting more information related to a nearby incident. Since the user's location has been tracked and stored in the network based system (i.e., the Internet, the Cloud, Intranet or other public or private network), an organization can review the historical location of such a user with respect to an incident or event to determine who may have been nearby at the time of the incident or event.

In another example, a user might need help and can solicit assistance from other nearby users of the system (such as, private citizen users, private organizations, public safety and law enforcement organizations) based on the user's proximity to them as represented on a map or based on a radius from the user requesting support as measured in feet, meters, miles or kilometers. This could be related to a "Good Samaritan" call to action such as "my car is out of gas" or "can you help me shovel the snow from my front walkway." Users would be able to opt in to this feature and their personal data can remain anonymous if they set this as their preference. Users can earn rewards or other forms of recognition for participating in the above for mentioned activities.

Figure 10A:
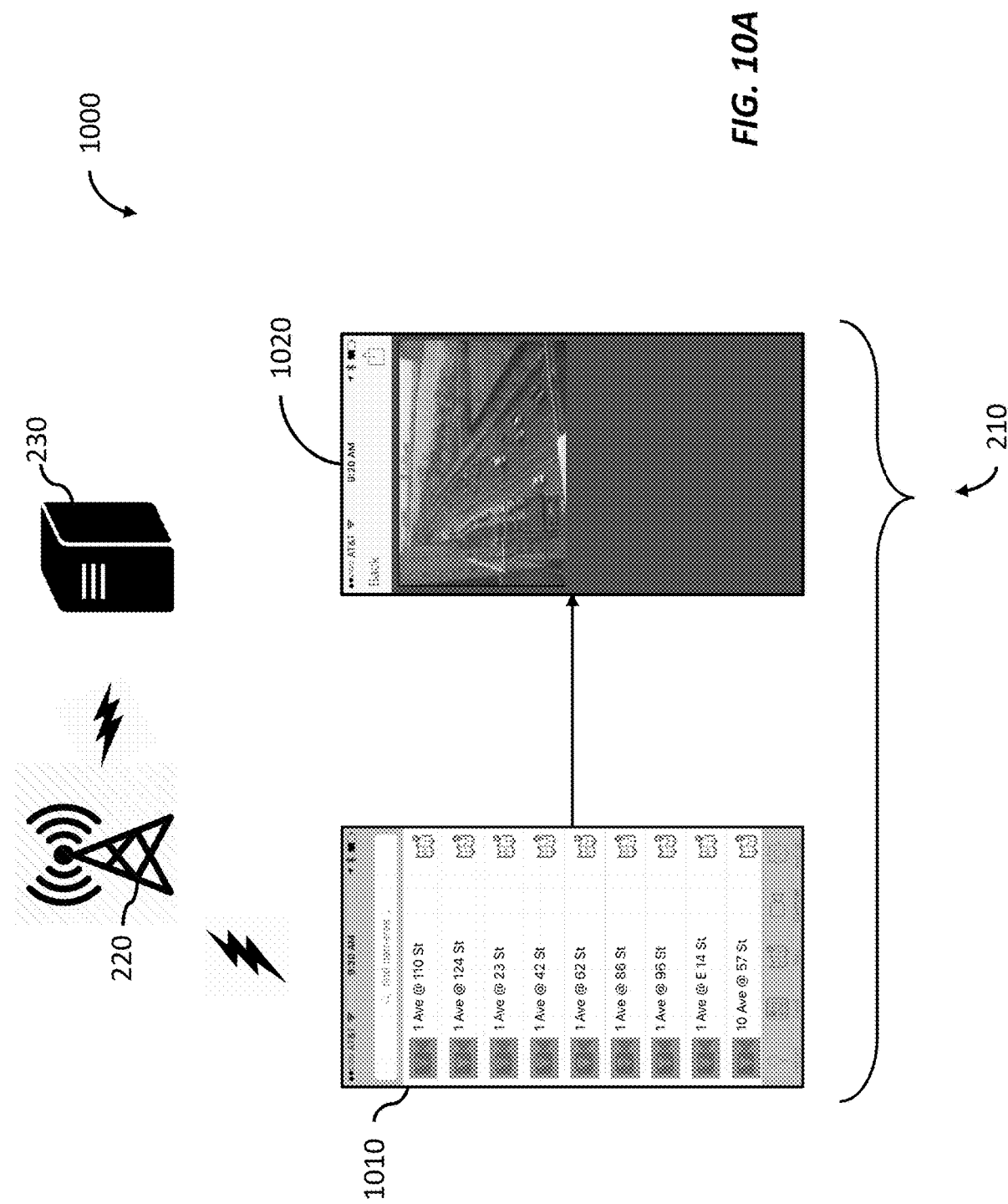
FIG. 10A is a diagram of an example implementation for viewing media from remote devices based on proximity to a predetermined location.
Figure 10B:
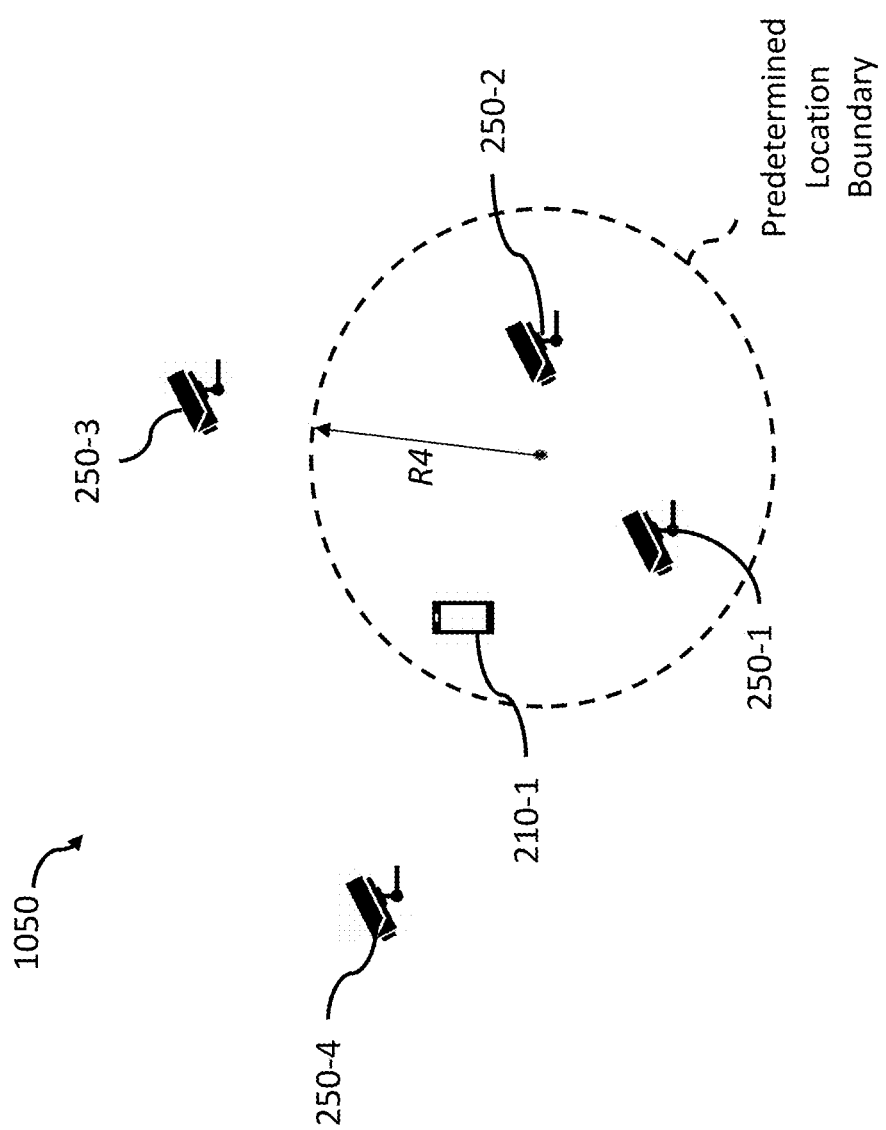
FIG. 10B is a diagram of an example environment for viewing media from remote devices based on proximity to a predetermined location.

FIGS. 10A and 10B are diagrams of an example environment (1000 and 1050, respectively) illustrating a user selecting and viewing media from a remote device 250 that are proximate to a predetermined location, such as proximate to the user. As shown in FIG. 10A, A user may initiate or receive a request for a plurality of remote devices 250 proximate to a predetermined location using a device 300. As shown in FIG. 10B, a user device 210-1 may be determined to be proximate to remote devices 250-1 and 250-2 because user device 210-1 is within a boundary of radius R4 around a specific geographic coordinate, while remote devices 250-3 and 250-4 are outside the boundary of radius R4. As noted above, other parameters may be used to determine the boundary. Server platform 230, using location information from the user device 210, may determine whether the user is proximate to the predetermined location. Server platform 230 then transmits to the user device 210 a list of the plurality of remote devices 250 determined to be proximate to the predetermined location. The user device 210 receives the list transmitted by the server platform 230, and displays the plurality of remote devices as a list or on a diagrammatic representation (see FIG. 12) where the location of each of the remote devices 250 is indicated relative to the user device 210, illustrated at 1010. The user, using the user device 210, may select a remote device 250 from the display of diagrammatic representation. The user may then view media from the selected remote device 250, illustrated at 1020.

Figure 11:
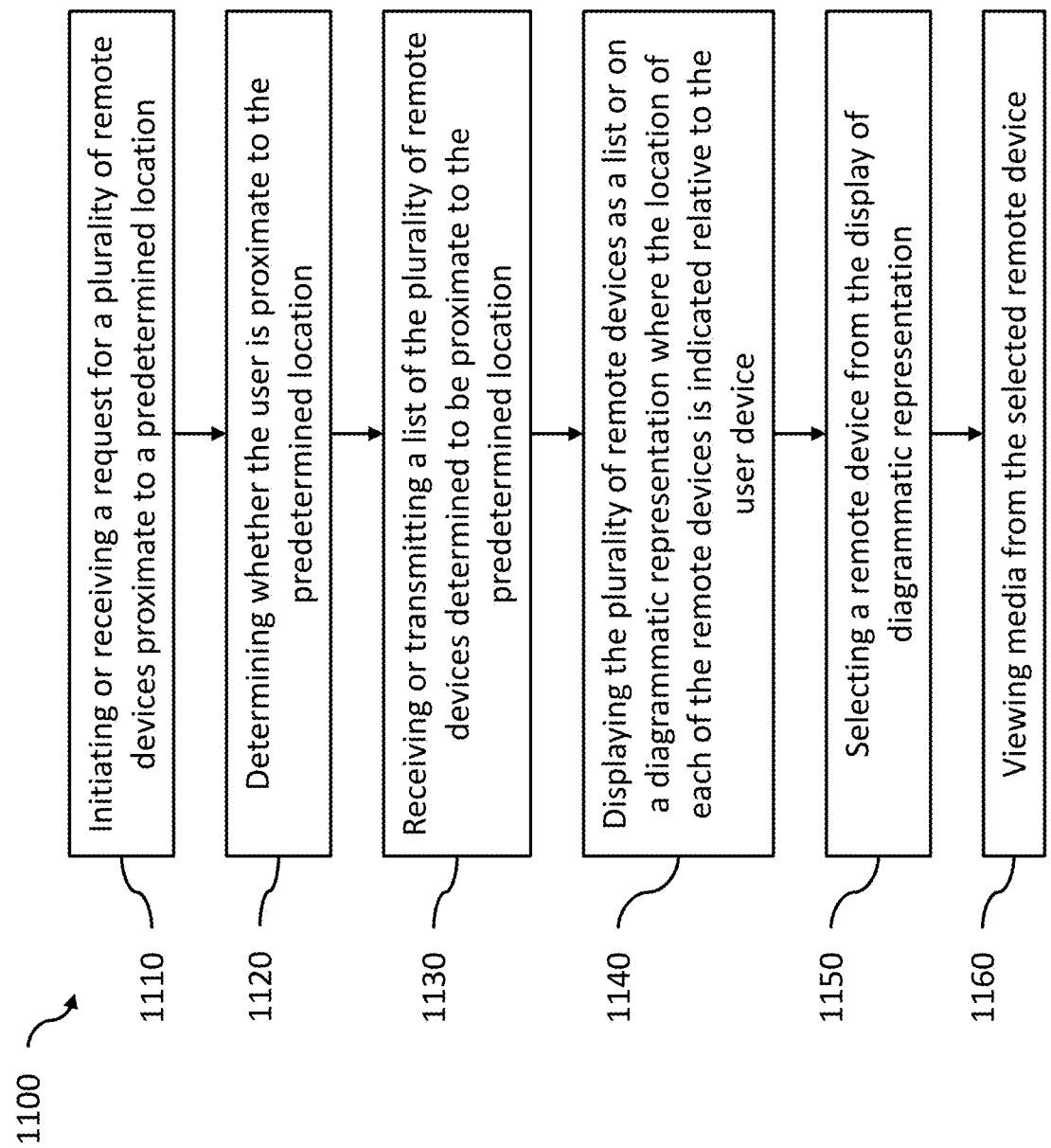
FIG. 11 is a flow chart of an example process for viewing media from remote devices based on proximity to a predetermined location.

Referring to FIG. 11, process 1100 may include a user initiating or receiving a request for a plurality of remote devices proximate to a predetermined location (block 1110). For example, the user, using user device 210, may select a remote device icon, which initiates a contact with server platform 230 to retrieve a list a remote device 250 near the user.

As further shown in FIG. 11, process 1100 may include determining whether the user is proximate to the predetermined location (block 1120). For example, the location user device 210 may be determined to be within a boundary about the predetermined location, such as a radius, as illustrated in FIG. 10B. Other parameters may be used as well, as noted above.

As further shown in FIG. 11, process 1100 may include receiving or transmitting a list of the plurality of remote devices determined to be proximate to the predetermined location (block 1130). For example, server platform 230 may transmit a list of remote devices 250 to user device 210 that have been determined to be in proximity to the user device 210.

As further shown in FIG. 11, process 1100 may include displaying the plurality of remote devices on a diagrammatic representation where the location of each of the remote devices is indicated relative to the user device (block 1140). For example, a list of devices may be transmitted to the user device 210 by the server platform 230, and the user device may display the list to the user, illustrated at 1010 of FIG. 10A. In another exemplary implementation, remote devices 250-1, 250-2, 250-3 may be displayed in a diagrammatic representation as shown in FIG. 12 at 1210.

As further shown in FIG. 11, process 1100 may include selecting a remote device from the display of the list or diagrammatic representation (block 1150) and viewing media from the selected remote device (block 1160). For example, the user may select with input component 350 a remote device 250 to view media, such as photos or a live video feed therefrom, as illustrated at 1010 of FIG. 10A.

Figure 12:
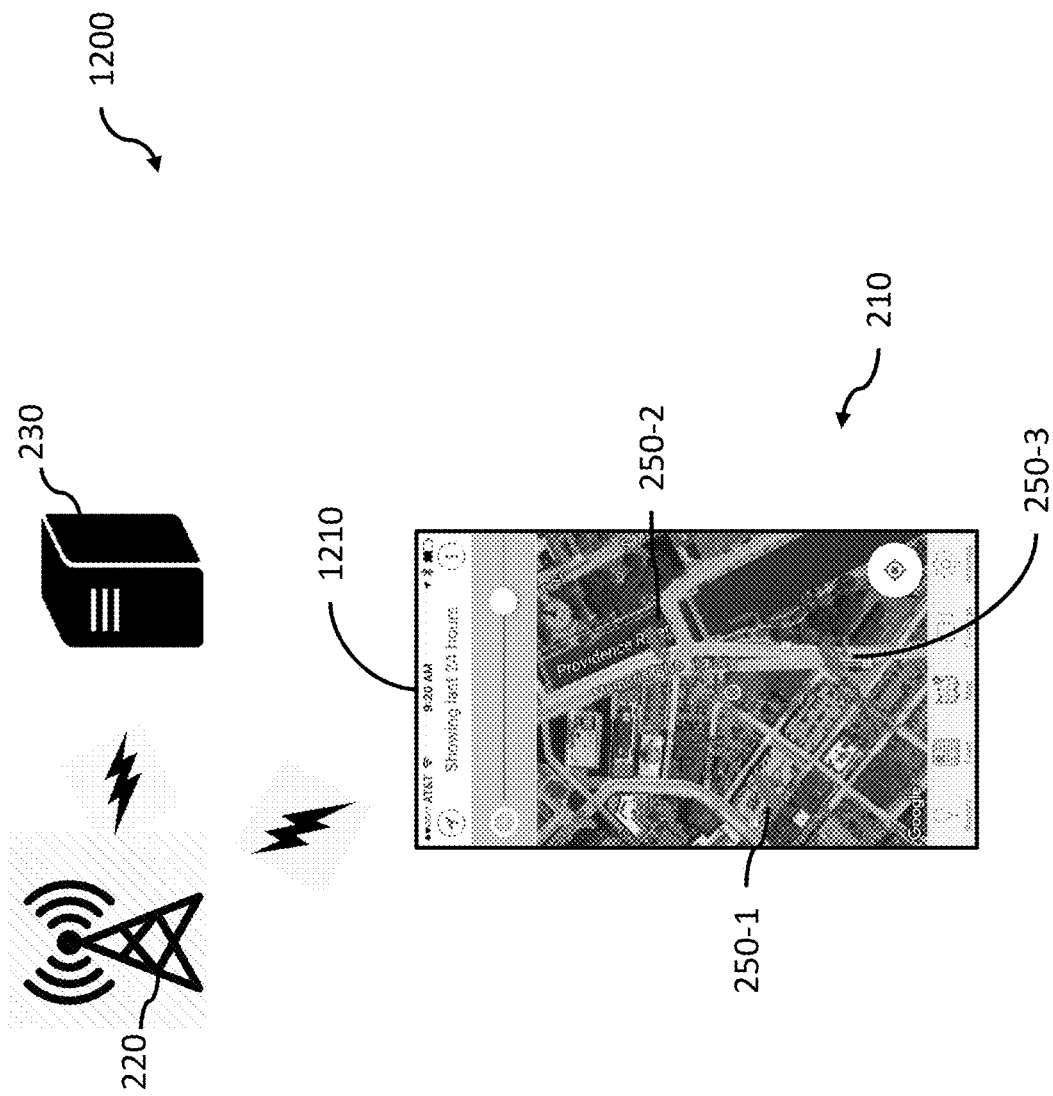
FIG. 12 is a diagram of an example implementation for requesting, receiving and viewing diagrammatic representations of an area on a user device based on proximity to a predetermined location.

FIG. 12 is a diagram of an exemplary environment 1200 where a user may initiate and receive relevant maps, floor-plans, and blueprints according to an aspect of the method and system described herein. As shown in FIG. 12, a user may initiate or receive a request for diagrammatic representation of a predetermined location proximate to them. This request may occur automatically based on the user's location. Server platform determines whether the user is proximate to the predetermined location and then transmits the diagrammatic representation to the user device 210, which receives the diagrammatic representation. The user device 210 displays the diagrammatic representation to the user where the user may view the diagrammatic representation on the user device 210.

Figure 13:
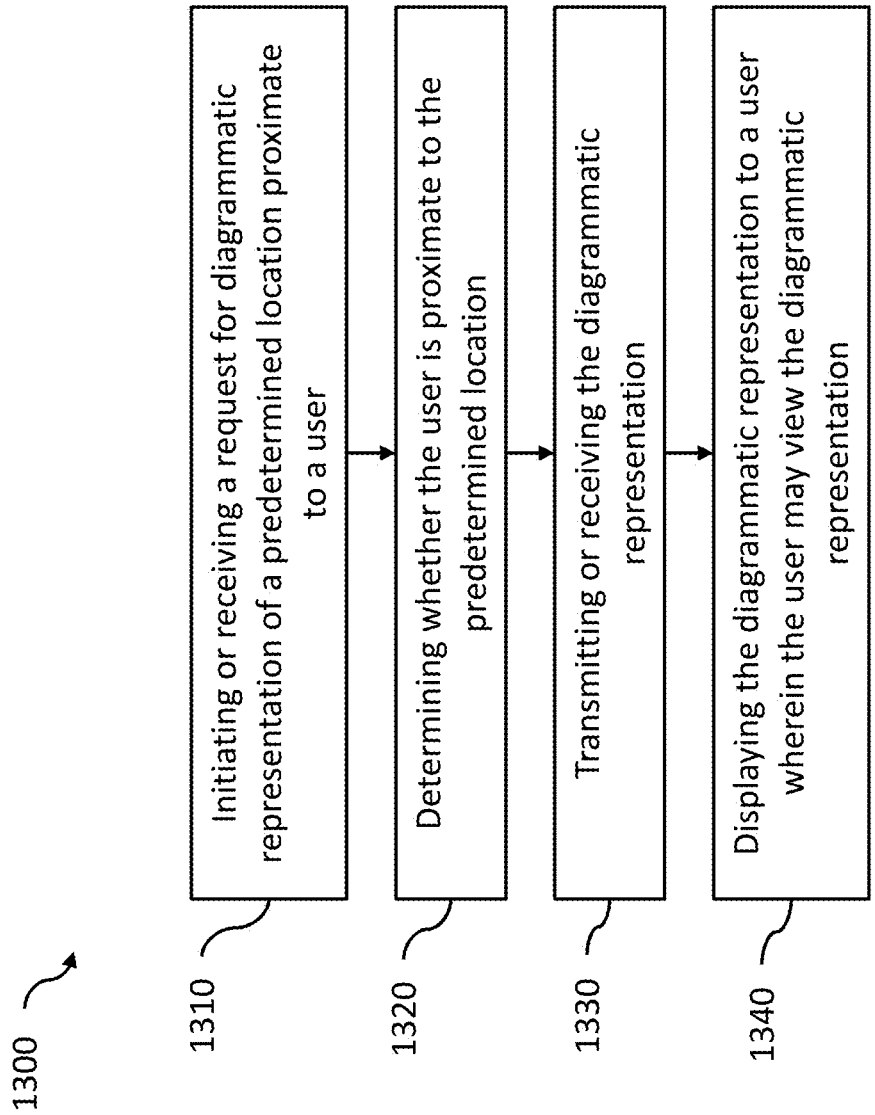
FIG. 13 is a flow chart of a process for requesting, receiving and viewing diagrammatic representations of an area on a user device based on proximity to a predetermined location.

Referring for FIG. 13, process 1300 may include initiating or receiving a request for diagrammatic representation of a predetermined location proximate to a user (block 1310). For example, user device 210 may trigger an automatic request for a diagrammatic representation of an area upon entering or crossing a boundary or a predetermined location.

As further shown in FIG. 13, process 1300 may include determining whether the user is proximate to the predetermined location (block 1320). As shown in FIG. 8 or 10B, the boundary may be defined as a radius about a specific geographic coordinate. Other parameters may be used to define the boundary as described elsewhere herein.

As further shown in FIG. 13, process 1300 may include transmitting or receiving the diagrammatic representation (block 1330). For example, server platform 230 may transmit the diagrammatic representation through the network 220 to the user device 210.

As further shown in FIG. 13, process 1300 may include displaying the diagrammatic representation to a user wherein the user may view the diagrammatic representation (block 1340). For example, the output component 360 of the user device 210 may display the diagrammatic representation to the user.

Figure 14:
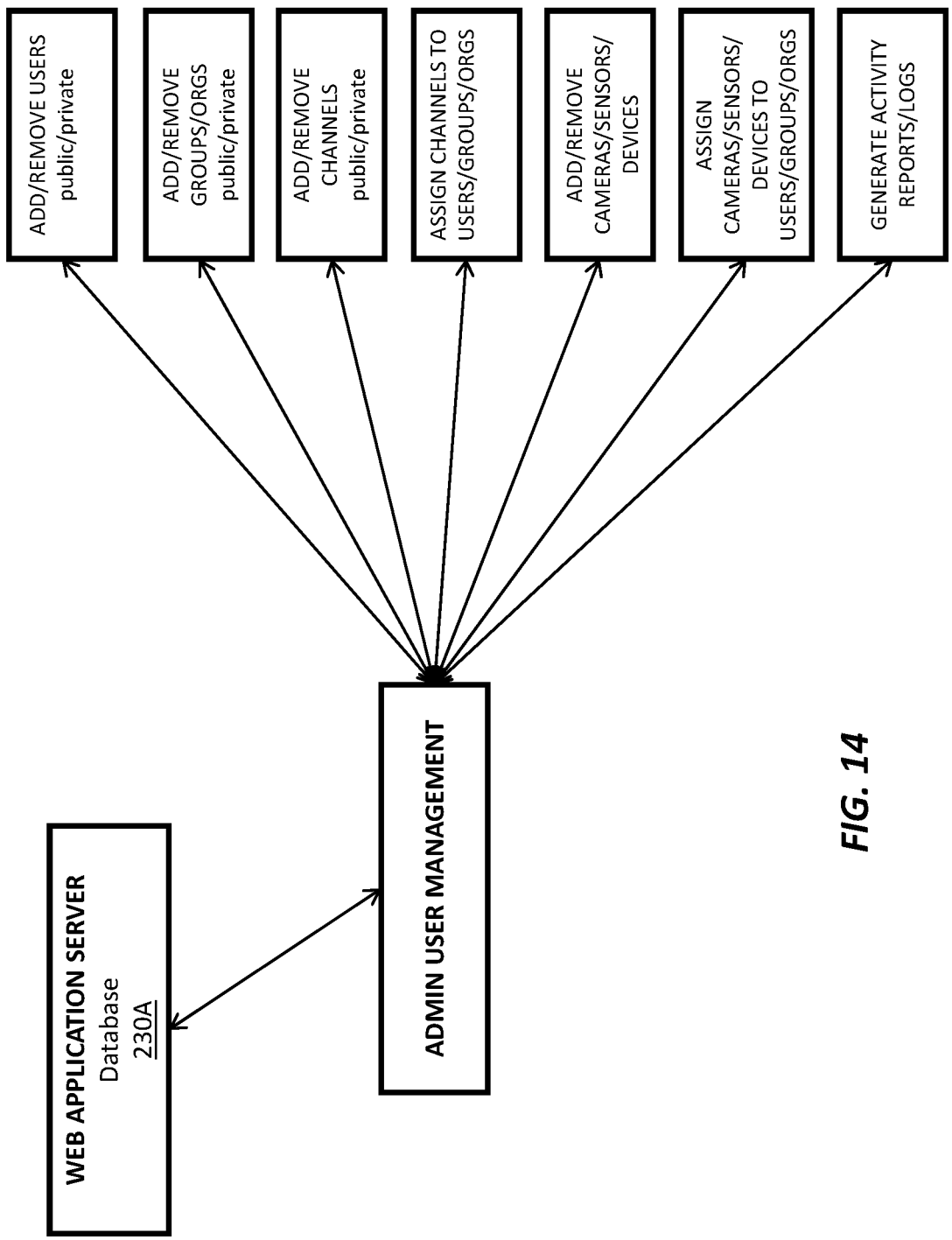
FIG. 14 is a diagram of an example implementation showing how users are managed in accordance with the method and system described herein.

FIG. 14 is a diagram of an overview of the administrator management and control of users. The application server database, which may be a component of the cloud-based platform illustrated in FIG. 1, includes several features for management of users of the system.

As further shown in FIG. 14, the system includes an Add/Remove Users function, which allows system administrators to manually add and remove user profiles to the system and further to toggle users as public and private.

As further shown in FIG. 14, the system includes an Add/Remove Groups and Organizations (also referred to as "requesting authorities") function, which allows system administrators to manually add groups and organizations profiles to the system and further allows groups and organizations to be marked as private or public.

As further shown in FIG. 14, the system includes an Add/Remove Channels functions, which permits system administrators to manually add or remove channels from the system and further to mark channels as public or private.

As further shown in FIG. 14, the system includes an Assign Channels functions, which permits system administrators to control ownership and access privileges to individual channels for each user profile and group or organization profile of the system.

As further shown in FIG. 14, the system includes an Add/Remove Cameras/Sensors/Devices function, which permits system administrators to add and remove remote devices to the system. The System also includes an Assign Cameras/Sensors/Devices function, which permits system administrators to control ownership and access privileges to individual devices for each user profile and group or organization profile of the system.

As further shown in FIG. 14, the system further includes a Generate Activity Reports/Logs function, which permits system administrators to generate reports and logs of usage of the system and associated statistics.

Figure 15:
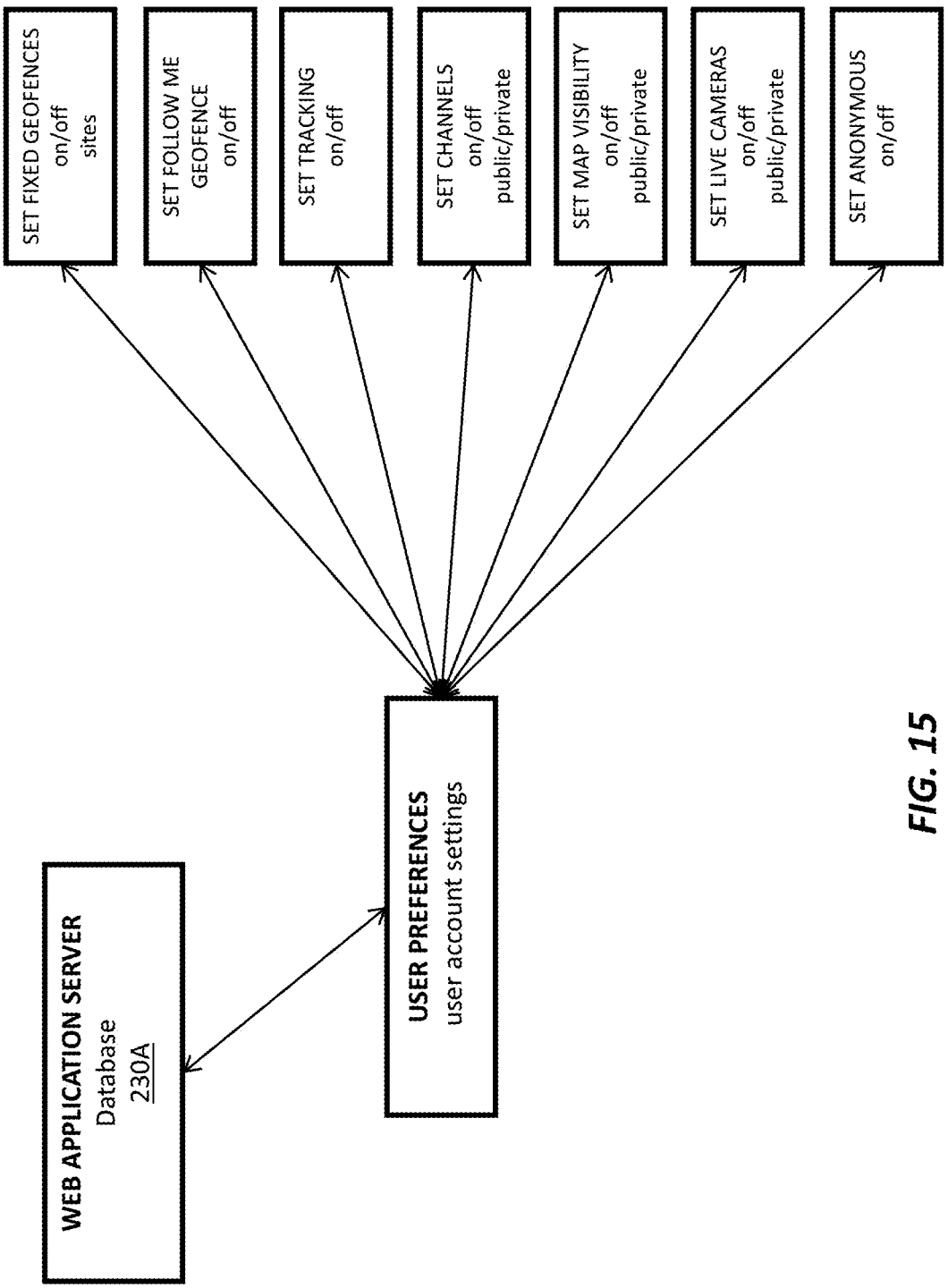
FIG. 15 is a diagram of an example implementation showing how a user's preferences are managed in accordance with the method and system described herein.

Referring to FIG. 15, an exemplary implementation of how a user of the system may control their preferences is shown generally. Each user profile may include account settings where a user may select or toggle defaults or preferences for each account setting. User preferences are stored in the application server database.

As further shown in FIG. 15, a user may set and toggle geo-fences on or off. This feature allows a user to receive, or repress, incident information for a location as desired, regardless of the user's proximity to the location.

As further shown in FIG. 15, a user may toggle a "follow me" setting on or off. The "follow me" setting, when activated, allows a user to receive incident information from a geo-fence, after the user has left the proximity of the geo-fenced area. This setting allows users to be contacted later by requesting authorities for possible incident information, even though the user is not in the vicinity of the incident location any longer. Similarly, the user may toggle tracking on or off, which allows the user's device location to be continually tracked by the system.

As further shown in FIG. 15, a user may toggle desired channels on or off as well. A user's posts of incident information may be marked as public or private. Private posts are still visible to requesting authorities, but not other users of the system.

As further shown in FIG. 15, a user may toggle their location on maps on or off, and further as public or private. Requesting authorities may still view a user's location marked as private.

As further shown in FIG. 15, a user may control access to any live video from a camera on their device by toggling the camera setting on or off, and further may mark any live video feed as public or private. Requesting authorities may still view a user's live video feed marked as private. Further, a user may mark their user profile as anonymous. A profile marked as anonymous, removes user identification for any posts, even for requesting authorities.

Figure 16:
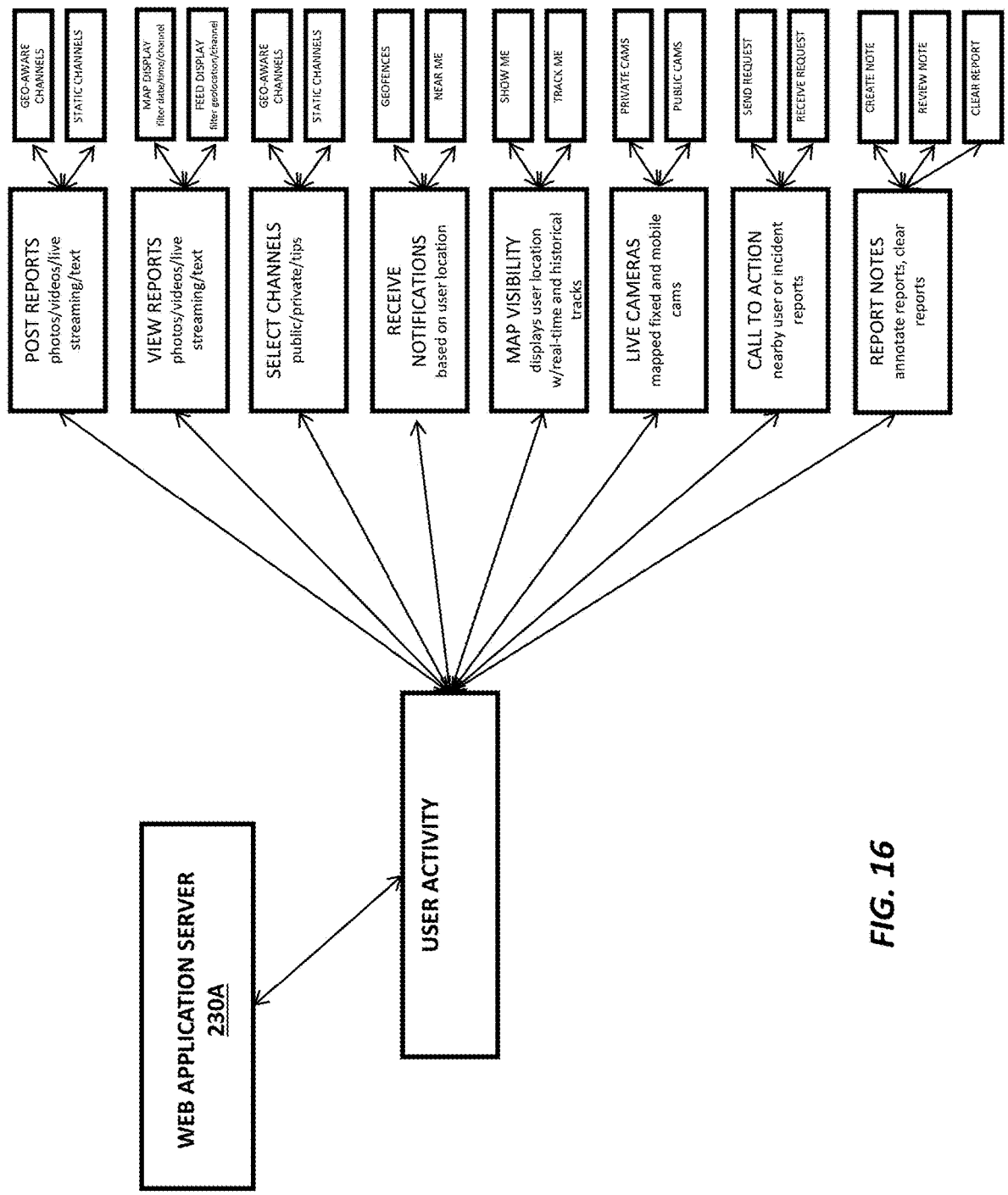
FIG. 16 is a diagram of an example implementation showing how a user's activity is monitored in accordance with the method and system described herein.

FIG. 16 is a diagram of an exemplary implementation of how a user activity may be tracked in the system 100. As shown in FIG. 16, web application server 230*a* may handle and receive requests of user activity from the user devices and requesting authority devices 240.

Web applications server 230*a* may receive post reports from users of the system, including photos, videos, live streaming and text messages from users. These posts may be gathered through static channels or geo-aware-channels that continuously update as users enter and leave "geo-fenced" areas or predetermined locations.

Activity reports with statistic of photos, videos, live streaming and text messages may also be compiled and organized by location, via a map display, optionally filtered by date, time and channel, or a feed display, optionally filtered by geolocation or channel.

Channels may be selected that have been designated as public, private or as tips. These results may be further filtered by geo-aware channels and static channels. Notifications received may be viewed and sorted based on user locations and further filtered based on geo-fences and proximity to a specific user.

Map visibility settings may be viewed for users in real-time and historical patterns as well. On a per-user basis, users may be tracked and reveled.

Live cameras, and other remote devices, may be viewed and sorted based on fixed emplacement and mobile cameras. These results may be further sorted based on privacy settings of the remote devices.

Requesting authority "calls to action", i.e. request for information, or alerts, may be viewed and sorted based on user or incident. Send requests and receive requests may be viewed and sorted independently. A notes module is further included providing the ability to create, review, annotate and delete reports.

Therefore, it can be seen that the present method and system provides a unique solution to the problem of providing users with relevant maps, floorplans, blueprints automatically based on the user's location.

It would be appreciated by those skilled in the art that various changes and modifications can be made to the illustrated embodiments without departing from the spirit of the present disclosure. All such modifications and changes are intended to be covered by the appended claims.

What is claimed is:

1. A method, comprising:
   initiating, by a device, a request for diagrammatic representation of a predetermined location proximate to a user;
   receiving, by the device, the diagrammatic representation;
   displaying, by the device, the diagrammatic representation to the user wherein the user may view the diagrammatic representation; and
   toggling, on the device, on or off a "follow me" setting permitting, or not permitting, the device to be geographically tracked and contacted after leaving the predetermined location proximate to the user.

2. The method of claim 1, wherein the request is initiated automatically.

3. The method of claim 2, wherein the request is initiated automatically based on a determined location of the user's device within a predefined boundary.

4. The method of claim 3, wherein the predefined boundary is selected from a group consisting of a postal code, a town, a city, a state, a county, a geographic region, a predefined radius around a specific geographic coordinate.

5. The method of claim 1, wherein the diagrammatic representation of the predetermined location proximate to the user is selected from a group consisting of maps, floorplans and blueprints.

6. The method of claim 1, further comprising:
   determining, by the device, whether the user is proximate to the predetermined location.

7. The method of claim 1, wherein the predetermined location is selected from a group consisting of a postal code, a town, a city, a state, a county, a geographic region, a predefined radius around a specific geographic coordinate.

8. A non-transitory computer-readable medium storing instructions, the instructions comprising:
   one or more instructions that, when executed by one or more processors, at least partially implemented in hardware, of a device, cause the one or more processors to:
   initiate a request for diagrammatic representation of a predetermined location proximate to a user;
   receive the diagrammatic representation;
   display the diagrammatic representation to the user wherein the user may view the diagrammatic representation; and
   toggle on or off a "follow me" setting permitting, or not permitting, the device to be geographically tracked and contacted after leaving the predetermined location proximate to the user.

9. The non-transitory computer-readable medium of claim 8, wherein the request is initiated automatically.

10. The non-transitory computer-readable medium of claim 9, wherein the request is initiated automatically based on a determined location of the user's device within a predefined boundary.

11. The non-transitory computer-readable medium of claim 10, wherein the predefined boundary is selected from a group consisting of a postal code, a town, a city, a state, a county, a geographic region, a predefined radius around a specific geographic coordinate.

12. The non-transitory computer-readable medium of claim 8, wherein the diagrammatic representation of the predetermined location proximate to the user is selected from a group consisting of maps, floorplans and blueprints.

13. The non-transitory computer-readable medium of claim 8, wherein one or more instructions that, cause the one or more processors further to determine whether the user is proximate to the predetermined location.

14. The method of claim 8, wherein the predetermined location is selected from a group consisting of a postal code, a town, a city, a state, a county, a geographic region, a predefined radius around a specific geographic coordinate.

15. A system, comprising:
a server, the server configured to:
- receive, from a device, a request for diagrammatic representation of a predetermined location proximate to the device;
- determine, from the device, a device location relative to the predetermined location proximate to the device; and
- transmit, to the device, the diagrammatic representation of the device location; and
- determine the state of a "follow me" setting permitting, or not permitting, the device to be geographically tracked and contacted after leaving the predetermined location proximate to the user.

16. The system of claim 15, wherein the request is initiated automatically.

17. The system of claim 16, wherein the request is initiated automatically based on the determined location of the user's device within a predefined boundary.

18. The system of claim 17, wherein the predefined boundary is selected from a group consisting of a postal code, a town, a city, a state, a county, a geographic region, a predefined radius around a specific geographic coordinate.

19. The system of claim 15, wherein the diagrammatic representation of the area is selected from a group consisting of maps, floorplans and blueprints.

* * * * *